Sept. 21, 1926.
A. J. BISHOP
DEFLECTOR FOR HEADLIGHTS
Filed Sept. 16, 1925
2 Sheets—Sheet 2
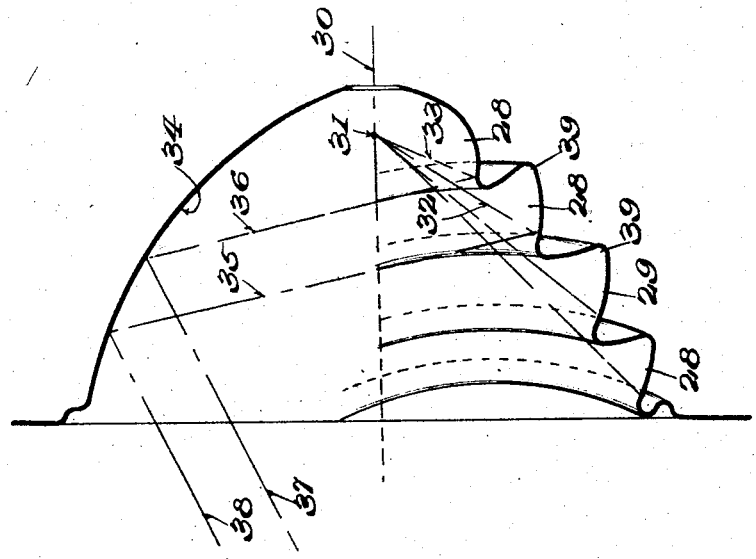
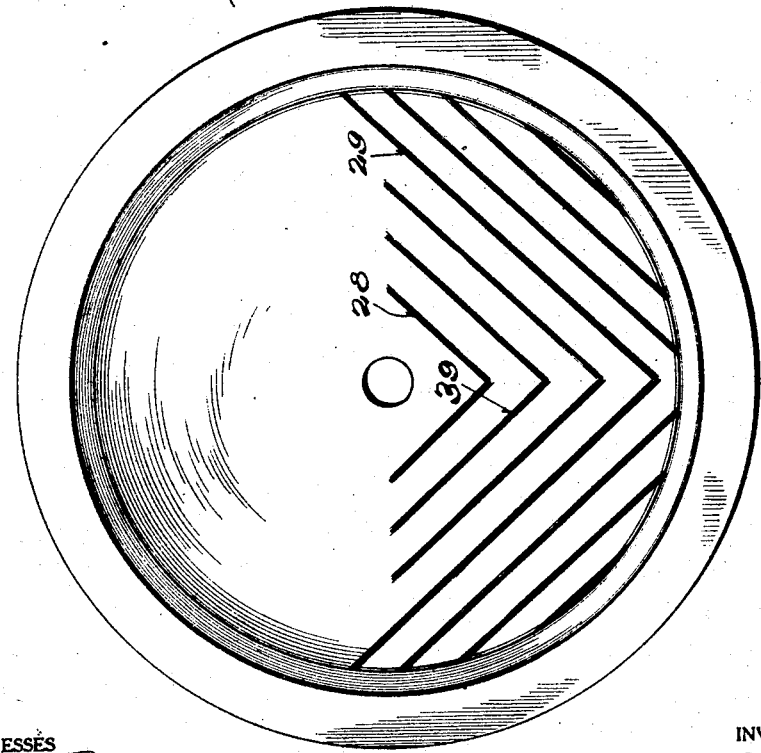
WITNESSES
INVENTOR
A. J. Bishop,
BY
ATTORNEYS Patented Sept. 21, 1926.

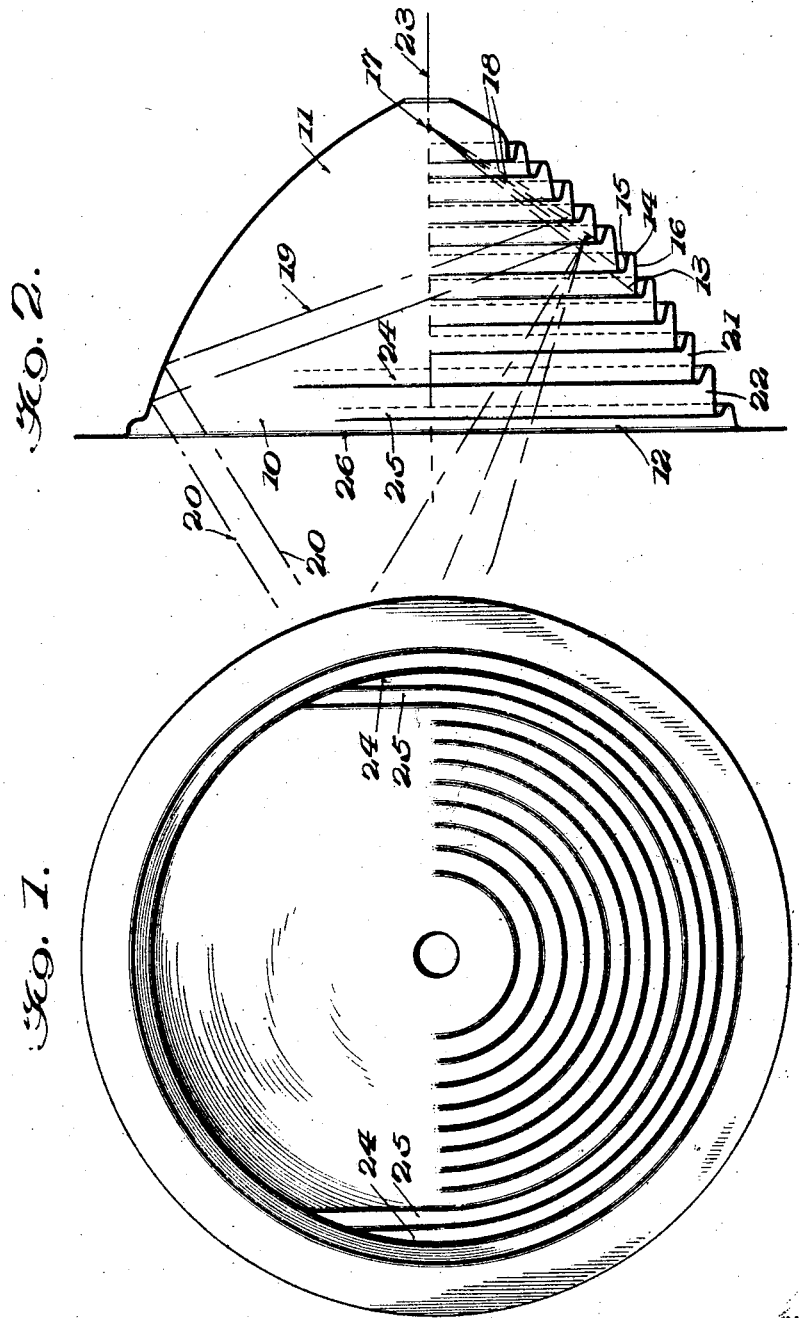

1,600,271

UNITED STATES PATENT OFFICE.

ALVAH J. BISHOP, OF LINCOLN, MAINE, ASSIGNOR OF ONE-HALF TO WALTER W. STEEVES, OF LINCOLN, MAINE.

DEFLECTOR FOR HEADLIGHTS.

Application filed September 16, 1925. Serial No. 56,678.

This invention relates to deflectors for headlights and has for its object the provision of a device that will brilliantly illuminate the roadway from a point directly in front of the vehicle to which the device has been applied to a point far in advance of the vehicle, but will prevent the usual glare.

A further object of the invention is the provision of a reflector having stepped reflecting surfaces in its lower section with a portion of each step overlapping an adjacent step so that a wall will connect adjacent steps which has a dull surface whereby the light will be reflected on only the exposed polished stepped reflecting surfaces to the upper section of the reflector and then forwardly and downwardly from the automobile.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in elevation of the reflector constructed in accordance with the principles of my invention, showing the stepped overlapped reflecting surfaces.

Figure 2 is a vertical section of the reflector shown in Figure 1.

Figure 3 is a view in elevation of a modified form of the reflector shown in Figure 1.

Figure 4 is a vertical section of the reflector shown in Figure 3.

Referring more particularly to the Figures 1 and 2, a parabolic reflector 10 is provided which is pressed or stamped from sheet metal and has the greater portion of its upper section 11 provided with a smooth highly polished reflecting surface while the lower section 12 is formed of stepped semi-cylindrical reflecting surfaces 13, the stepped reflecting surfaces being connected together by a rear wall 14 and it will be noted that the wall is bent rearwardly as shown at 15 with the returned portion 15 and the reflecting surface 13 of the stepped portions overlapping the rear portion 16 of the stepped portions 13. The stepped portions 13 are highly polished to provide reflecting surfaces while the rear walls have been provided with a dull finish.

A source of light of the usual type is placed at the focus 17 so that the rays from this light, as shown at 18, which impinge upon the reflecting surfaces 13 are reflected along the line 19 to the smooth reflecting surface 11. These rays are then reflected along the line 20 outwardly and downwardly of the lamp.

The stepped sections 21 and 22 are carried upwardly and beyond the horizontal plane passing through the axis 23 of the reflector as shown respectively at 24 and 25 for a purpose to be presently explained. These semi-circular stepped portions are located adjacent the periphery 26 of the reflector. The upper ends of each of the stepped sections merge into the smooth reflecting surface 11.

Referring more particularly to Figures 3 and 4, the construction shown in these figures is similar to the construction shown in Figures 1 and 2 except that the stepped sections are V-shaped as shown at 28.

The source of light as shown at 31 is placed at the focus of the parabolic reflector and lines 32 and 33 indicate rays of light from the source which are reflected by the stepped sections 28 to the reflecting surface of the upper section 34 as indicated by respective lines 35 and 36 whence the light is again reflected at the same angle of incidence outwardly and forwardly as indicated by the respective lines 37 and 38. The stepped sections 28 and 29 are connected together by a surface 39 which has no reflecting power and only the surfaces 28 and 29 and the surface of the upper section 34 are treated in any suitable manner to provide highly reflecting surfaces.

Extensions or stepped sections 24 and 25 and 29 above the horizontal plane passing through the axis of the reflector are for the purpose of stopping a spot of glare at that point so that the light will be reflected laterally from each side of the reflector.

The use of the connecting walls 14 of Figure 2 and 39 of Figure 4 provide a reinforced connection between the various arcuately shaped curved flat surfaces 16 and 28 respectively and since these portions show a dull polished surface and form a pocket for the light and thereby eliminate much of the glare which would ordinarily be thrown forwardly and into the eyes of the driver of an oncoming vehicle so that approximately one-half of the surfaces 16 and 28 reflect, the remaining portions of light rays being projected towards the dull polished surfaces. These dull surfaces give the gradual dimming appearance so that the reflector will give the proper lighting effect at approximately 200 feet while as the driver of an approaching vehicle moves closer to the headlight the effect of dimming will be had and thus eliminate the glare.

What I claim is:

1. In a projection lamp, an upper half having a paraboloidal reflecting surface, a source of light at the focus thereof, and a lower half comprising a plurality of reflecting surfaces arranged in step-like formation, a portion of one surface being in overhanging and light shielding relation with an adjacent surface, the stepped surfaces of larger diameter being extended above the horizontal plane passing through the axis of the paraboloidal reflecting surface to prevent the reflection of light from the shielded portion.

2. In a projection lamp, an upper half having a paraboloidal reflecting surface, a source of light at the focus thereof, and a lower half comprising a plurality of V-shaped reflecting surfaces arranged in step-like formation, a portion of one stepped surface being in overhanging and light shielding relation with an adjacent surface to prevent the reflection of light from the shielded portion, the stepped surfaces of larger diameter being extended above the horizontal plane passing through the axis of the paraboloid reflecting surface.

ALVAH J. BISHOP.